US012516597B2

(12) United States Patent
Fripp et al.

(10) Patent No.: US 12,516,597 B2
(45) Date of Patent: Jan. 6, 2026

(54) MONITORING FLUID/CEMENT TYPE/QUALITY OUTSIDE OF CASING OF A BOREHOLE

(71) Applicant: Halliburton Energy Services, Inc., Houston, TX (US)

(72) Inventors: Michael Linley Fripp, Singapore (SG); Shanshan Yu, Singapore (SG); Rutger Evers, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 160 days.

(21) Appl. No.: 17/965,307

(22) Filed: Oct. 13, 2022

(65) Prior Publication Data

US 2024/0125225 A1   Apr. 18, 2024

(51) Int. Cl.
*E21B 47/00* (2012.01)
*E21B 47/005* (2012.01)
*G01N 27/22* (2006.01)
*G01N 27/74* (2006.01)
*G01N 33/38* (2006.01)

(52) U.S. Cl.
CPC ......... *E21B 47/005* (2020.05); *G01N 27/221* (2013.01); *G01N 27/74* (2013.01); *G01N 33/383* (2013.01)

(58) Field of Classification Search
CPC .... E21B 47/005; G01N 27/221; G01N 27/74; G01N 33/383
See application file for complete search history.

(56) References Cited

U.S. PATENT DOCUMENTS

| 2,377,501 | A | * | 6/1945 | Kinley | E21B 47/113 166/66 |
| 2,669,689 | A | * | 2/1954 | Doll | G01V 3/20 324/347 |
| 2,688,872 | A | * | 9/1954 | Hartline | E21B 47/047 73/304 R |
| 2,695,671 | A | * | 11/1954 | Kingston | E21B 47/10 166/184 |
| 3,417,823 | A | * | 12/1968 | Faris | E21B 43/16 204/515 |
| 4,763,520 | A | * | 8/1988 | Titchener | E21B 43/26 340/854.6 |

(Continued)

FOREIGN PATENT DOCUMENTS

GB   2475450 A   5/2011

*Primary Examiner* — Edwin J Toledo-Duran
(74) *Attorney, Agent, or Firm* — Scott Richardson; Parker Justiss, P.C.

(57) ABSTRACT

Determining one or more of a fluid composition, a cement state, or a cement quality of a material located downhole a borehole by using a capacitive sensor or an inductive sensor. The sensors can be located on a pipe positioned downhole or within a swell packer. More than one sensor can be used, for example, as a set of sensor systems. The sensors can be of different sizes, utilize different frequencies, or be spaced unevenly to analyze different shaped areas and depths from the sensors. More than one set of sensors can be employed, such as axially or circumferentially spaced along the pipe or swell packer. The relative dielectric permittivity of the various downhole material can be used to determine when pumped cement has displaced the borehole fluid and when the cement has cured. The process can determine if a micro annulus or crack exists in the cement.

26 Claims, 9 Drawing Sheets

(56) References Cited

U.S. PATENT DOCUMENTS

| | | | | |
|---|---|---|---|---|
| 4,794,322 A * | 12/1988 | Davies | G01N 17/02 324/357 |
| 4,857,831 A * | 8/1989 | Davies | G01R 27/02 324/357 |
| 5,509,474 A | 4/1996 | Cooke, Jr. | |
| 5,751,895 A * | 5/1998 | Bridges | E21B 47/13 392/306 |
| 5,784,530 A * | 7/1998 | Bridges | E21B 43/2401 166/60 |
| 9,249,646 B2 * | 2/2016 | Hannegan | E21B 33/14 |
| 9,494,032 B2 * | 11/2016 | Roberson | E21B 33/13 |
| 10,145,775 B2 * | 12/2018 | Savari | G01N 7/00 |
| 10,392,932 B2 * | 8/2019 | Wilson | E21B 49/00 |
| 2007/0151724 A1 * | 7/2007 | Ohmer | E21B 47/01 166/187 |
| 2008/0308271 A1 * | 12/2008 | Chouzenoux | E21B 47/13 166/250.02 |
| 2011/0061863 A1 * | 3/2011 | Ramakrishnan | E21B 33/124 166/250.14 |
| 2011/0168446 A1 * | 7/2011 | Lemenager | G01V 11/002 175/50 |
| 2012/0175135 A1 | 7/2012 | Dyer et al. | |
| 2014/0367092 A1 * | 12/2014 | Roberson | E21B 43/25 166/250.01 |
| 2015/0034311 A1 * | 2/2015 | Tunget | E21B 47/12 166/250.14 |
| 2015/0167440 A1 * | 6/2015 | Kasevich | E21B 7/15 166/52 |
| 2015/0219783 A1 * | 8/2015 | Sitka | G01V 3/26 324/326 |
| 2016/0077236 A1 * | 3/2016 | Bonavides | G01V 3/28 324/339 |
| 2017/0342818 A1 * | 11/2017 | Roberson | E21B 17/08 |
| 2018/0223654 A1 * | 8/2018 | Roberson | E21B 47/16 |
| 2018/0252100 A1 * | 9/2018 | Ranjan | E21B 47/017 |
| 2019/0360322 A1 | 11/2019 | Bloemenkamp et al. | |

* cited by examiner

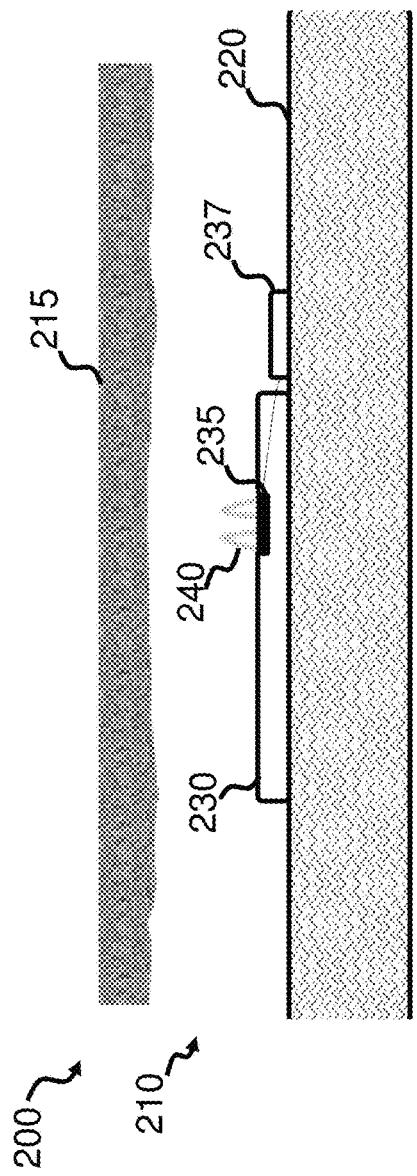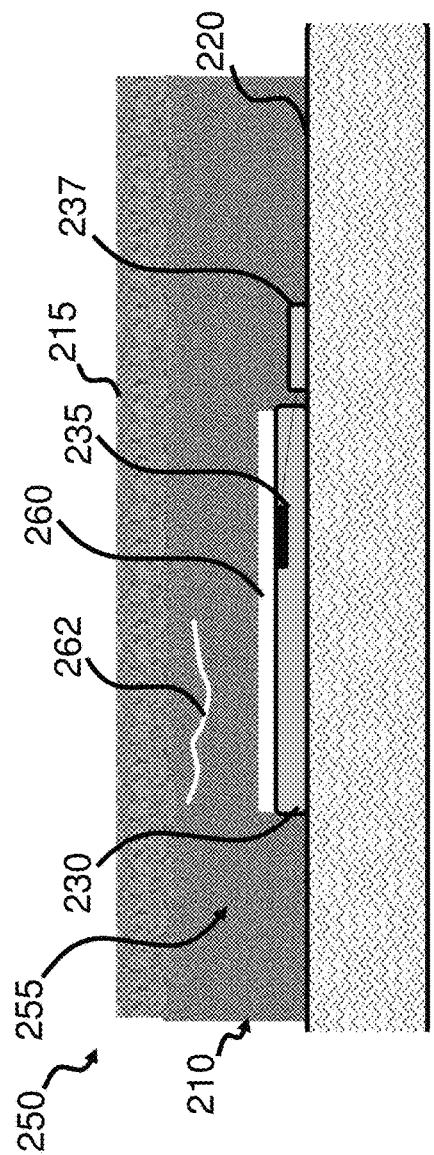
FIG. 2A
FIG. 2B

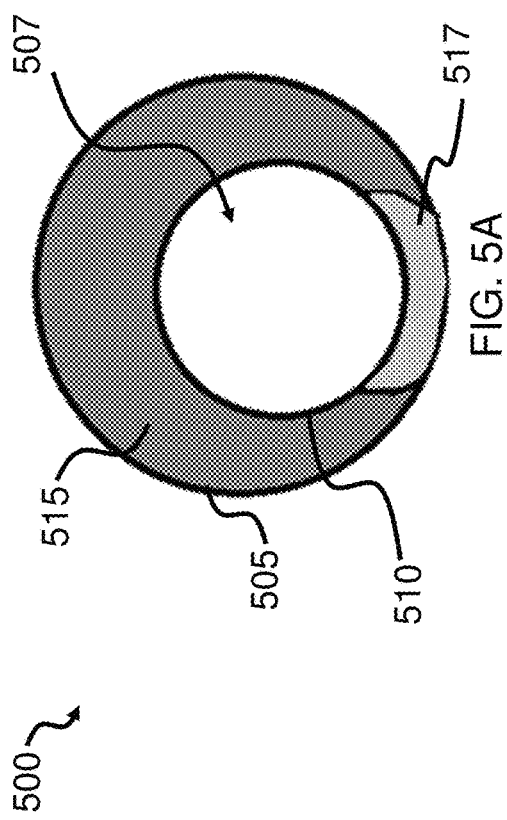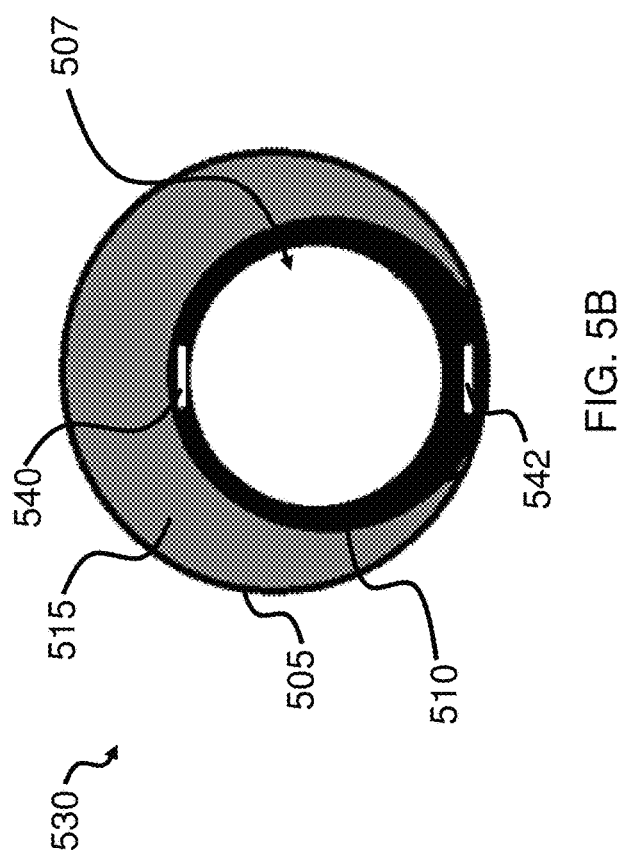

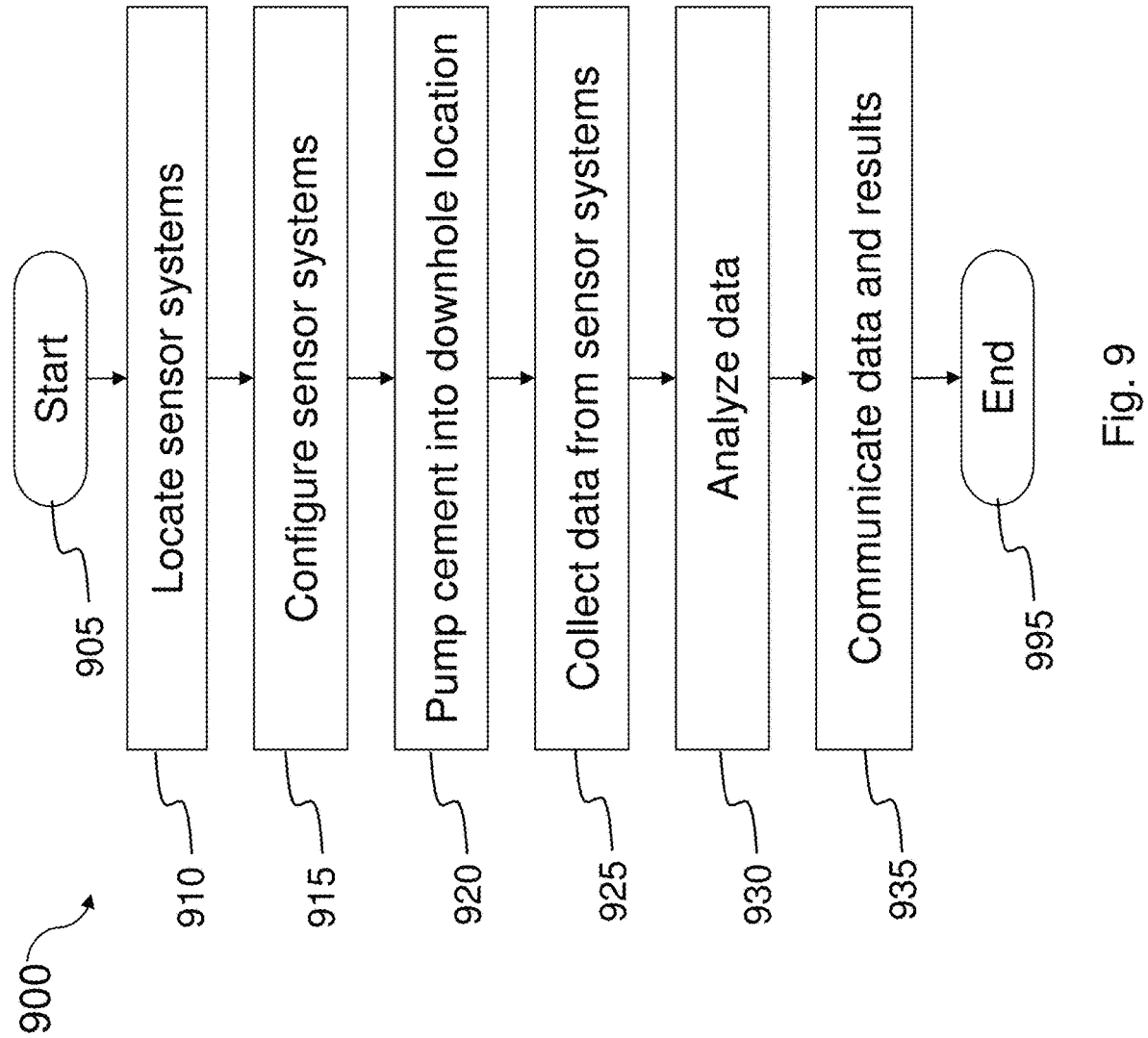

MONITORING FLUID/CEMENT TYPE/QUALITY OUTSIDE OF CASING OF A BOREHOLE

TECHNICAL FIELD

This application is directed, in general, to monitoring fluid used in borehole operations, and more specifically, to monitoring the quality of the cement.

BACKGROUND

In some borehole operations, one or more swell packer assemblies may be installed in a borehole. Generally, swell packer assemblies are run into a borehole in a contracted state during completion operations. With the packer assembly positioned in a desired location in the borehole, the packer assemblies may be configured to expand from the contracted state to an expanded state and seal against a borehole wall. Conventionally, fluid, cement or other binding material may be pumped into a location of the borehole filling in gaps between the fluid pipes and swell packers and the formation wall. It would be beneficial to know what fluid exists in the annulus, how well the cement has filled in the gaps and if other fluid remains at the location of the cement.

SUMMARY

In a first aspect, a sensor system is disclosed. In one embodiment, the sensor system includes (1) a set of electrodes located proximate a packer, wherein the packer is operational to expand to seal against a subterranean formation around a borehole, where the packer is attached to an OD of a pipe and the pipe is inserted in the borehole, and wherein the set of electrodes is configured to measure one or more electromagnetic properties of a material between the packer and the subterranean formation, and (2) an electronics system operational to receive data from the set of electrodes and to communicate with one or more borehole systems.

In a second aspect, a method is disclosed. In one embodiment, the method includes (1) locating one or more sensor systems proximate a pipe positioned downhole a borehole, (2) configuring the one or more sensor systems, wherein the configuring includes operating in at least one time interval, or applying at least one frequency to an electrode of a sensor of the one or more sensor systems, and where the one or more sensor systems are one or more of a capacitive sensor or an inductive sensor, (3) pumping cement to the location of the sensor systems, (4) collecting data from the sensor systems during the at least one time interval, and (5) analyzing the data to generate results, where the results include determining one or more of a fluid composition or a cement state, wherein the analyzing utilizes a relative dielectric permittivity difference of one or more of the fluid composition, an uncured cement, or a cured cement.

In a third aspect, a computer program product having a series of operating instructions stored on a non-transitory computer-readable medium that directs a data processing apparatus when executed thereby to perform operations to monitor cement quality downhole a borehole is disclosed. In one embodiment, the operations include (1) configuring one or more sensor systems that are located proximate a pipe positioned downhole the borehole, wherein the configuring includes operating in at least one time interval, or applying at least one frequency to an electrode of a sensor of the one or more sensor systems, and where the one or more sensor systems are one or more of a capacitive sensor or an inductive sensor, (2) collecting data from the sensor systems during the at least one time interval while cement is being pumped to the location of the sensor system, and (3) analyzing the data to generate results, where the results include determining one or more of a fluid composition or a cement state, wherein the analyzing utilizes a relative dielectric permittivity difference of one or more of the fluid composition, an uncured cement, or a cured cement.

BRIEF DESCRIPTION OF THE DRAWINGS

These drawings illustrate certain aspects of some of the embodiments of the present disclosure and should not be used to limit or define the method.

FIG. 2A is an illustration of a diagram of an example side view of a swell packer within a borehole;

FIG. 2B is an illustration of a diagram of an example side view of a swell packer and cement pumped into borehole;

FIG. 5A is an illustration of a diagram of an example swell packer monitoring showing a cross section of a borehole;

FIG. 5B is an illustration of a diagram of an example swell packer monitoring after the swell packer has expanded;

FIG. 9 is an illustration of a flow diagram of an example method to monitor the quality of a cement job.

DETAILED DESCRIPTION

Figure 1:
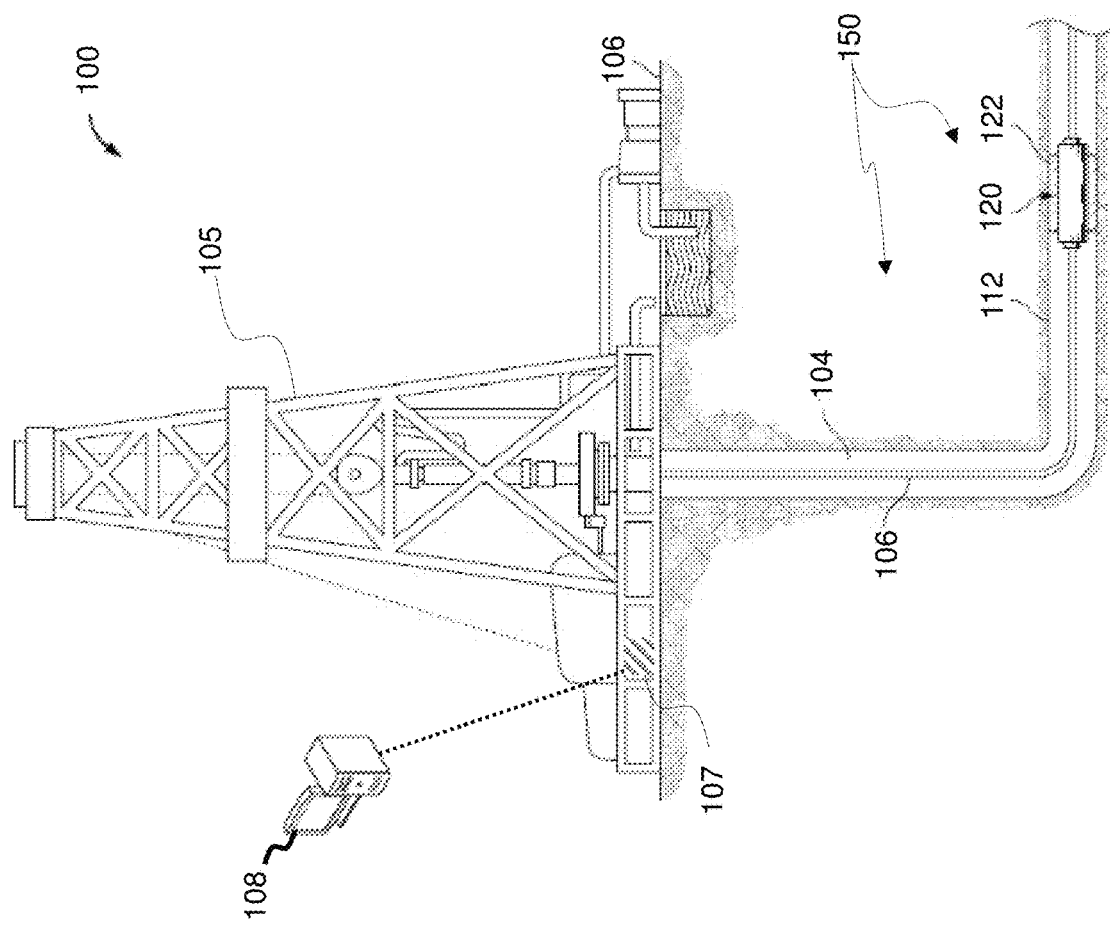
FIG. 1 illustrates a borehole completion system having a downhole packer system located in a borehole.

During the finalization of a borehole for future fluid operations, cement or other binding material can be pumped downhole to locations within the borehole to fill in gaps between the pipes inserted in the borehole and the subterranean formation wall of the borehole. The fluid operations can be hydraulic fracturing (HF), the extraction of fluids of interest from a downhole location, such as oil and gas fluids, or other types of fluid operations. The pipes can be one or more pipes located downhole and coupled to a surface location, such as a derrick or other surface equipment. The pipes can be one or more fluid pipes, communication pipes, electrical pipes, other pipe types, or various combinations thereof.

Along the pipes, packers (e.g., swell packers configured to expand in response to one or more activation fluids) or other materials can be attached. After pumping the cement downhole, there could be gaps in the cement coverage, there could be other fluids mixed with the cement, there could be pockets of other fluids trapped within the cement, or other situations that indicate a less than ideal state for the cement. Being able to determine the cure state of the cement can also be valuable for determining the next steps for borehole completion operations. Being able to identify these various cement states or fluid-cement combination states can be valuable in evaluating the operations and determining if corrective actions are needed. Identifying whether corrective actions are needed earlier in the operations stage can lower the cost of performing the operation and improve the efficiency of the borehole operations for later stages of operation.

This disclosure presents systems and methods for monitoring the quality of cement at locations within a borehole. Quality of cement can include a determination of whether cement has filled in the intended gaps downhole, a determination of whether a micro annulus formed around a swell packer, a determination of whether the micro annulus closed after another cement operation, a determination of what type or whether the appropriate fluid is around a swell packer, and other determinations.

To determine the quality of the cement, one or more sensors can be included with pipe sections downhole. In some aspects, sensors can be mounted on the exterior of the pipe casing (e.g., on the outer diameter (OD)) and inserted into the borehole. In some aspects, sensors can be embedded within or placed on a swell packer element. Embedded sensors can perform multiple actions, such as measuring the swell packer swelling, as well as detecting the cement quality.

The sensors used can be capacitive or inductive sensor types (e.g., respectfully a capacitive sensor system or an inductive sensor system). Sensors can be direct current or alternating current types. In some aspects, the sensors that are used can utilize different sizes. In some aspects, the sensors that are used can utilize multiple frequencies. By varying the sensor size or sensor frequency, different evaluation depths can be analyzed or different sized cement cracks can be analyzed. For example, if data collected from different sized sensors, or sensors using different frequencies, result in a similar evaluation of the cement quality, then the confidence level of that analysis increases, such as generating a confidence parameter as part of the analysis results.

For example, capacitive sensors can measure the capacitance of nearby materials. The material parameter that the sensor is detecting can be represented as the relative dielectric permittivity of the target material. Table 1 shows a sample, for demonstration purposes, of relative dielectric permittivity for different materials. A doped rubber can be an elastomer where high dielectric particles are compounded into the elastomer. The cement, water, drill mud, or rubber can be mixed with particles with a high dielectric permittivity or a high magnetic permeability. In this disclosure, water includes brines, water with additives, such as chemical additives, and other generally accepted forms of water in use for completion operations of a borehole.

TABLE 1

Example of relative dielectric permittivity for various materials

| Material | Relative Dielectric | Relative Permeability | Resistivity (ohm-meter) |
|---|---|---|---|
| Metal | >1000 | ~1000 | $5e^{-8}$ |
| Water | 80 | 1 | 0.2 |
| Doped rubber | 30 | 30 | $1e^{13}$ |
| Wet cement | 15-30 | 1-2 | 100 |
| Cured cement | 1-6 | 1-2 | $1e^4$ |
| Oil | 2.5-3 | 1 | $1e^5$ |
| Rubber | 2-4 | 1 | $1e^{13}$ |

TABLE 1-continued

Example of relative dielectric permittivity for various materials

| Material | Relative Dielectric | Relative Permeability | Resistivity (ohm-meter) |
|---|---|---|---|
| EPDM | 3.3 | 1 | $1e^{13}$ |
| Air | 1 | 1 | $1e^{16}$ |

In a second example, inductive sensors can measure the inductance of nearby materials and in high-frequency modes can measure the electrical resistivity of the nearby material. The high-frequency mode can measure the eddy currents generated in the material. The inductance parameter that the inductive sensor is detecting is the magnetic permeability of the target material. The resistive parameter that the high-frequency inductive sensor is detecting is the electrical resistance of the target material. Table 1 shows a sample of relative magnetic permeability for different materials. A rubber doped for magnetic permeability can have particles with high magnetic permeability compounded into its matrix, for example, iron-based or nickel-based particles.

The sensors located downhole can provide real-time or near real-time data on the state of the swell packer and the type and/or quality of the fluid and/or cement in the annulus around the tubular. This can provide faster feedback to the operations controller, such as a well site controller, thereby minimizing the time spent waiting-on-cement. The monitoring can be used to validate the zonal isolation in the borehole. There can be more than one sensor located along a piece of pipe or swell packer. For example, three or four sensors can be located evenly spaced radially around the OD of the pipe or swell packer. The additional sensors can provide data collection around the outer diameter of the pipe. Additional sensors can be used, such as eight or ten sensors. For example, three sensors can use a spacing of approximately (e.g., plus or minus 10%) 120 degrees circumferentially, four sensors can use a spacing of approximately (e.g., plus or minus 10%) 90 degrees circumferentially, and ten sensors can use a spacing of approximately (e.g., plus or minus 10%) 36 degrees circumferentially. One or more additional sensors can be located along the lateral access of the pipe of the swell packer. Various combinations of sensors arranged radially (e.g., circumferentially) and laterally can be used to provide coverage of the cement along all locations of interest.

In some aspects, the sensors can detect the cure state of the cement, e.g., by detecting the amount of fluid remaining in the cement. In some aspects, the sensors can detect if pumped cement has reached a certain point within the borehole. For example, the sensors can detect borehole fluid nearby and as the fluid is displaced by the pumped cement, the sensor readings can change. That change can be interpreted as the cement filling the area formally occupied by the fluid. This information can be used, for example, to determine when to stop pumping cement or to adjust the pressure applied during the pumping operation.

In some aspects, the sensor system can examine the real and the imaginary part of the received signal. The imaginary part of the received signal is related to the losses in the measurement and is related to the resistance of the material (as well as other properties). In some aspects, the same sensor system or combination of sensor systems can be used to simultaneously detect the degree of swell within a swell packer as well as the nature (e.g., composition) of the fluid beyond the swell packer.

For example, an oil-swell rubber can be doped with high dielectric particles. Examples of high dielectric particles include oxides including metal oxides (e.g., copper calcium titanate, barium titanate, alumina, magnesia), silicon dioxide as well as carbon (e.g., graphite or carbon black). As a result, the doped oil-swell rubber has a higher dielectric than the oil-swell rubber in its original state. As the oil is absorbed into the oil-swell rubber, the dielectric of the expanding material decreases because the oil has a lower dielectric than the oil-swell rubber in its original state.

In some aspects, the swellable elastomers can be monitored with an inductive sensor. The water-swell and the oil-swell elastomer can be doped with a magnetic responsive material such as ferromagnetic particles (e.g., iron, nickel, chromium dioxide) or paramagnetic particles (e.g., iron oxide). The magnetic permeability can start high and then would decrease as the low permeability fluid swells the elastomer.

In some aspects, the sensor systems can be placed within the swell packer during the application of the swell rubber to the tubing. The rubber wrapping process can be briefly halted while the sensors are positioned and then the wrapping process can continue and the sensors would be encapsulated with the swell packer. In some aspects, the sensor systems can be placed after assembly. The swell packer can be slit and the sensor system installed.

The support electronics systems can measure the capacitance. For example, a resonant circuit can be created and the analysis can compute how the resonance changes. Another example can be to apply an alternating current signal and determine the amplitude or phase of the signal applied to the capacitor.

The support electronics systems can store the capacitance values or the value from a calculation that uses the capacitance measurements. The electronics system can communicate those values either to the surface or to another downhole tool. In some aspects, the communication can be a wired communication, for example, over a tubing encapsulated conductor (TEC). In some aspects, the communication can be a wireless communication, for example, an acoustic telemetry to a logging tool or an acoustic communication to a receiver tool mounted to the tubing. In some aspects, the sensor systems can be attached to the OD of the pipe, e.g., tubing or conveyance.

Turning now to the figures, FIG. 1 illustrates a borehole completion system 100 having a downhole packer system (e.g., a swell packer 120) located in a borehole 104, in accordance with some aspects of the present disclosure. As illustrated, swell packer 120 can be run-in-hole via a conveyance 106 (e.g., coiled tubing, segmented tubing, pipe, or other types of conveyances). Once swell packer 120 is run-in-hole to a desired location in borehole 104, conveyance 106 can hold swell packer 120 in the desired position. Swell packer 120 can include a swellable material 122 configured to expand in response to exposure to downhole activation fluids in borehole 104. In some aspects, swellable material 122 can expand in response to absorbing downhole activation fluid. Alternatively, exposure of swellable material 122 to the downhole fluid can be configured to initiate a chemical reaction configured to cause swellable material 122 to expand.

Expansion of swellable material 122 can begin while swell packer 120 is run-in-hole or at the desired location in borehole 104 based at least in part on the presence of downhole fluids in borehole 104. In some aspects, fluid from surface 110 can be pumped through conveyance 106 and into borehole 104 to initiate expansion of swellable material 122. Swellable material 122 can expand to seal swell packer 120 against a borehole wall 112 of borehole 104.

Borehole completion system 100 includes a derrick 105, a well site controller 107, and a computing system 108. Well site controller 107 includes a processor and a memory and is configured to direct operation of borehole completion system 100. Derrick 105 is located at surface 110.

Extending below derrick 105 is borehole 104. As part of swell packer 120, sensors can be embedded. In some aspects, electronics can be located along with the sensors. In some aspects, the electronics can be located outside of swell packer 120, such as attached to conveyance 106. In some aspects, the sensors can be located outside of swell packer 120, such as attached to conveyance 106. The electronics can include various downhole tools, such as capacitive or inductive sensors, a local power supply (e.g., generators, batteries, or capacitors), telemetry systems, sensors, transceivers, and control systems. Borehole 104 is surrounded by subterranean formation 150.

Well site controller 107 or computing system 108, which can be communicatively coupled to well site controller 107, can be utilized to communicate with the sensors and electronics, such as sending and receiving data, telemetry, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107. Well site controller 107 or computing system 108 can communicate with the sensors or electronics using conventional means, now known or later developed, to direct operations of the sensors.

A cement monitoring system can be present. The cement monitoring system can receive input parameters from the capacitive or inductive sensors located downhole as part of or proximate swell packer 120. In some aspects, the cement monitoring system can generate an analysis of the cement proximate swell packer 120 and determine recommendations for directing the completion operations. In some aspects, the cement monitoring system can produce visual graphs enabling a user to see where the cement may have defects, such as micro annulus or cracks. In some aspects, the cement monitoring system can generate the analysis in real-time or near real-time.

In some aspects, the cement monitoring system can communicate the analysis to another system, such as computing system 108 or well site controller 107 where the analysis can be combined with other analysis or used for decision making processes. In some aspects, computing system 108 can be the cement monitoring system and can receive some of the input parameters from one or more cement monitoring systems and can receive some of the input parameters from one or more of the sensors. In some aspects, the cement monitoring system can be partially included with well site controller 107 and partially located with computing system 108.

FIG. 1 depicts onshore operations. Those skilled in the art will understand that this disclosure is equally well suited for use in offshore operations, geothermal operations, or hydraulic fracturing operations. FIG. 1 depicts specific borehole configurations, those skilled in the art will understand that the disclosure is equally well suited for use in boreholes having other orientations including vertical boreholes, horizontal boreholes, slanted boreholes, multilateral boreholes, and other borehole types.

FIG. 2A is an illustration of a diagram of an example side view 200 of a swell packer within a borehole. Side view 200 is a partial view of a downhole location within a borehole 210 and has a pipe 220 (e.g., a conveyance, a tube, a mandrel, or other type of downhole tool) inserted through borehole 210. Surrounding borehole 210 is subterranean formation 215, where the top portion is shown. Attached to pipe 220 is a swell packer 230 with an embedded sensor system 235. Sensor system 235 can have one or more sensors of various types and sizes, and can operate at various frequencies. Electrically coupled to sensor system 235 is an electronics system 237, which, in this example, is located outside of swell packer 230 and attached to pipe 220.

Depending on the spacing of sensors in sensors system 235, various shapes and depths of analysis into borehole 210 can be achieved, such as shown by field 240, which can be an electric field or a magnetic field. Sensor system 235 can collect field data over time using capacitive or inductive sensors. The different arrangements of electrodes and of excitation frequencies can result in different breadth, arc, or depth examinations (e.g., different shapes of areas to analyze). In some aspects, the electrode can be the electrode in a capacitor. In some aspects, the electrode can be the electrode in a wire in an inductor. In some aspects, the electrode can be the location where the electrical charge or change electric field occurs.

Analyzing field 240 can result in an analysis of the fluid composition, cement cure state, or cement quality proximate sensor system 235. For example, sensor system 235 can be used to identify the type of fluid outside of swell packer 230, for example, downhole fluid, borehole fluid, mud, hydrocarbon, oil, gas, water, or brine (e.g., material in the borehole). Field 240 is an example field of a concentric arrangement of the sensors. In some aspects, field 240 can be in a parallel capacitor arrangement. In some aspects, other sensor arrangement patterns can be utilized.

Swell packers are typically designed to expand with certain types of fluids. A water-swell rubber will only swell in water and, thus, determining that there is oil proximate swell packer 230 can generate an alert that the swell packer is unlikely to swell or not swell during a prescribed time interval. In some aspects, the fluid composition analysis can be used to determine when the fluid is displaced by cement that is pumped in.

The data from field 240 can be collected and communicated to a cement monitoring system, where the analysis of the data can be conducted. Cement monitoring system can be part of a downhole electronics system, such as electronics system 237, part of a well site controller, such as well site controller 107, part of a computing system, such as computing system 108, or part of another operations system.

FIG. 2B is an illustration of a diagram of an example side view 250 of a swell packer and cement pumped into borehole 210. FIG. 2B builds on FIG. 2A. In this example, a cement 255 has been pumped into this location of borehole 210 and has cured. As cement 255 is pumped into borehole 210, the fluid will swap from a completion brine (or other borehole fluid type) to a wet cement, and then a cured cement. Sensor system 235 can detect a difference in the relative dielectric permittivity between the borehole fluid, wet cement, and cured cement. The relative dielectric permittivity differences (e.g., changes) can be used to indicate whether cement 255 has reached the region around swell packer 230 and when cement 255 has cured (e.g., the cured stated).

The capacitance will change with the existence of secondary features within cement 255. A micro annulus and internal cracks will create a difference in the measured capacitance, such as when using different frequencies of the capacitance measurement. The analysis can feature comparing the relative amplitude of the dielectric measurement at two or more different frequencies, or comparing the dielectric measurement at one frequency versus the average across a range of frequencies. In some aspects, sensor system 235 can be used to verify that a micro annulus that was created during cement shrinkage was closed through the continued expansion of swell packer 230.

In this example, an analysis of the sensor data collected indicates that there is a micro annulus 260 and a crack 262. This information can be part of the cement quality and include an existence of such defect, the size of the defect, and a relative position to the sensor of the defect. Should these defects be determined to be significant, corrective action can be taken. By utilizing sensors of different sizes or spacing, or by using various configurations of frequencies, the accuracy of the identified defects can be improved, e.g., represented by a confidence parameter. For example, one set of configured sensors can be used to determine the length of crack 262, and a second set of configured sensors can be used to determine the depth or distance from sensor system 235.

The accuracy of sensor system 235 can be enhanced by comparing the measurement with different internal pressures applied to pipe 220. Increasing the burst pressure will tend to close the secondary features (e.g., micro annuluses or cracks), while increasing the collapse pressure will tend to open the secondary features. Noting the change in the data collected from sensor system 235 as the internal pressure changes can help to identify whether there is noise in the data collected and thereby the processes can filter out that noise.

Figure 3:
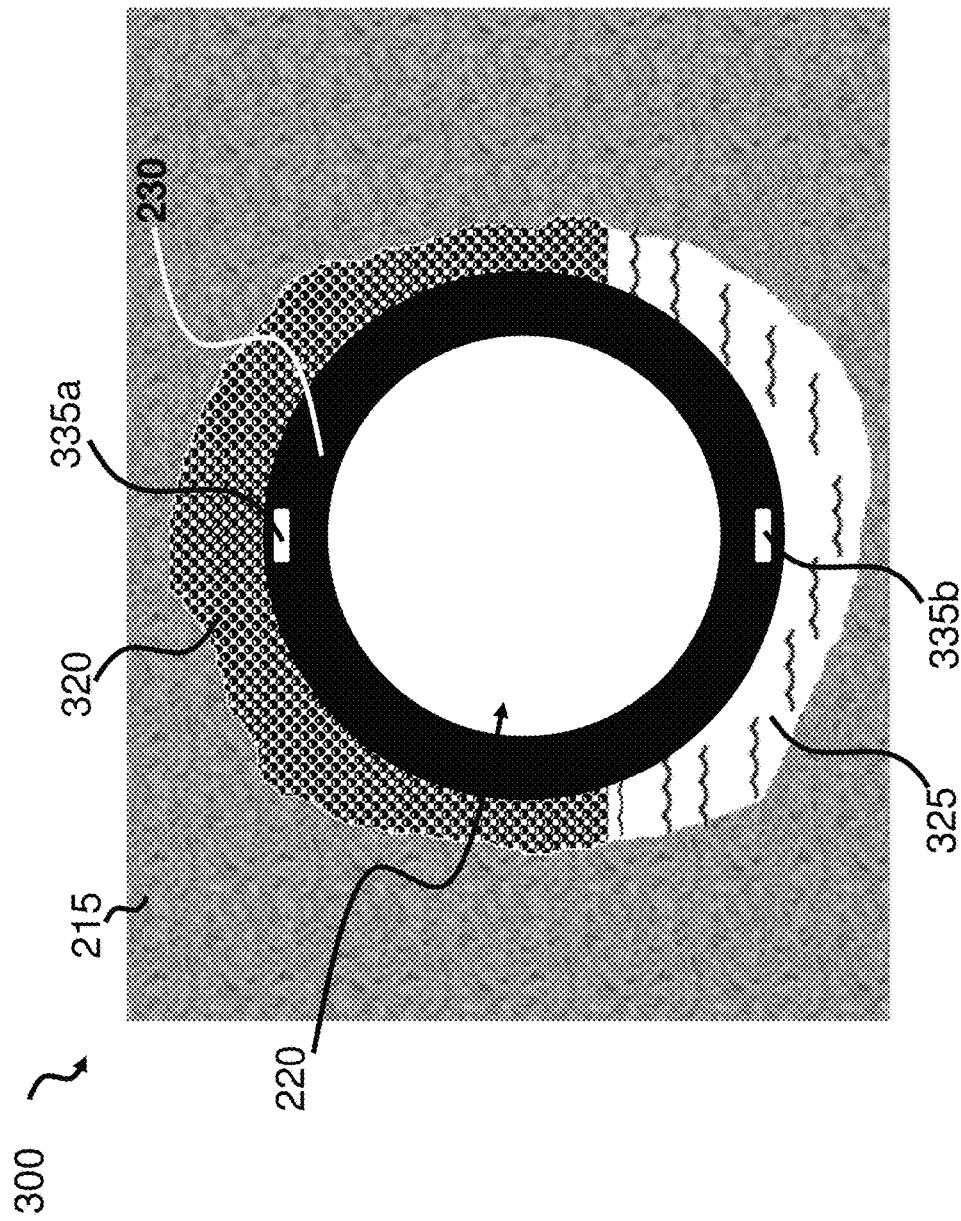
FIG. 3 is an illustration of a diagram of an example cross sectional view of a borehole showing an incomplete fluid swapping.

FIG. 3 is an illustration of a diagram of an example cross sectional view 300 of a borehole showing an incomplete fluid swapping. In some aspects, there can be incomplete swapping of fluids or poorly swapped fluids on one side of the swell packer. Poor swapping can be more likely to occur when the pipe is not well centralized. Poor swapping can result in one fluid on the high side of the swell packer, for example oil, and a different fluid on the low side of the swell packer, for example water. In aspects where cement has been pumped in and poor swapping has occurred, then it would likely be cement on the high side of the swell packer and a brine or mud on the low side of the swell packer.

Cross sectional view 300 is a variation of FIG. 2A. Sensor system 235 has been replaced by a sensor system 335a and a sensor system 335b (collectively, sensor system 335). In some aspects, there can be additional sensor systems, such as having three sensor systems spaced 120 degrees apart around the OD of pipe 220, or having 10 sensor systems spaced 36 degrees apart around the OD of pipe 220. Other counts of sensor systems can be used, such as having four, five, or other numbers of sensor systems.

Fluid swapping was poor in this example, with oil 320 being predominant on the high side of swell packer 230 and water 325 being predominant on the low side of swell packer 230. The ability to detect the fluid composition using the sensors can be used to determine this type of situation and informed corrective action can be performed.

Figure 4:
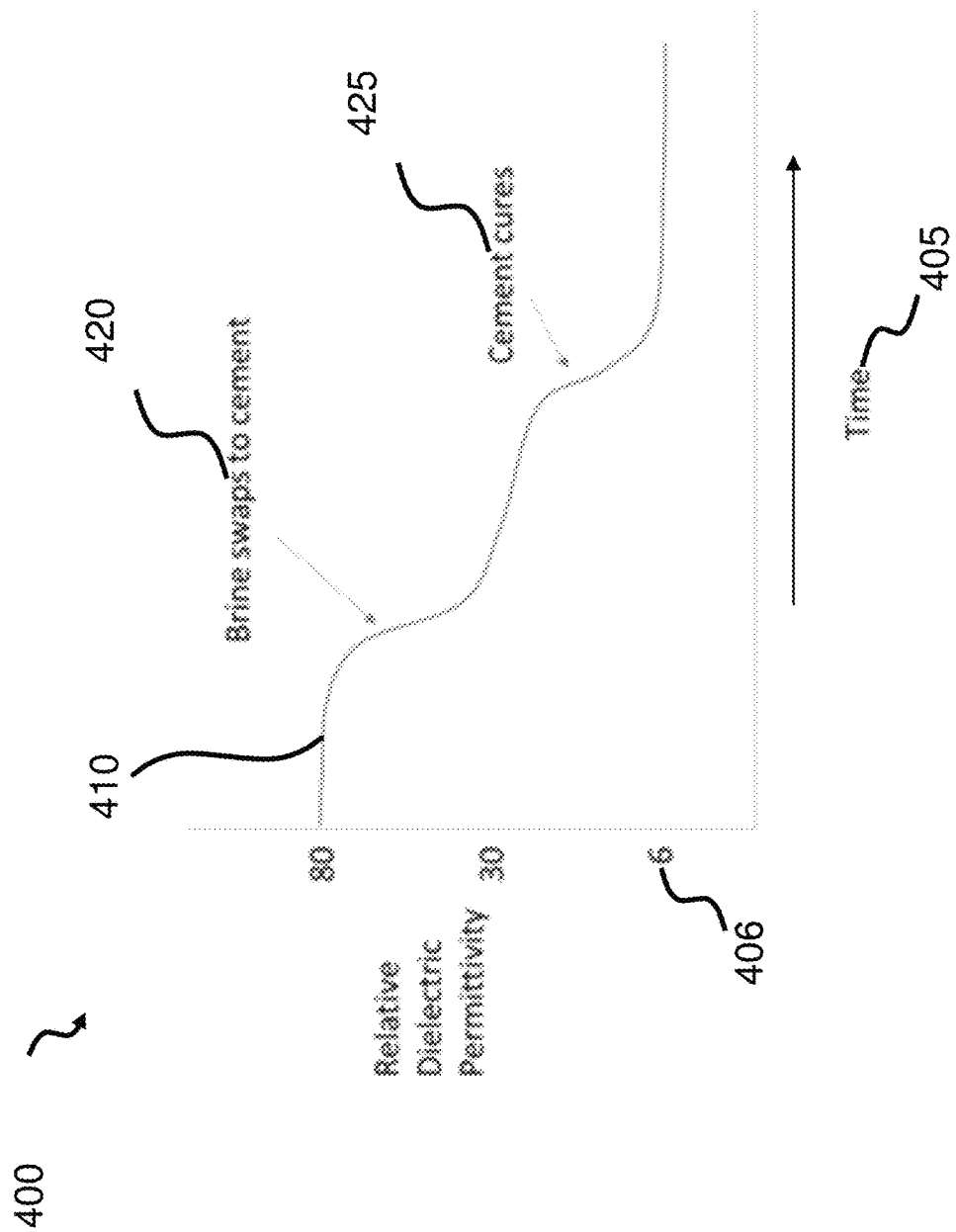
FIG. 4 is an illustration of a diagram of an example chart of a relative dielectric permittivity during a completion operation.

FIG. 4 is an illustration of a diagram of an example chart 400 of a relative dielectric permittivity during a completion operation. Chart 400 demonstrates how some of the analysis can be derived from the collected sensor data. It shows the variation in the dielectric permittivity during a cementing process. Chart 400 has an x-axis 405 for time and a y-axis 406 for the relative dielectric permittivity. The plot area has a line 410 showing the decrease of permittivity over the time interval of the completion operation.

In this example, the borehole fluid, brine, has an initial relative dielectric permittivity of approximately 80. As cement is pumped into the location, the dielectric permittivity drops over a portion of line 410 at line portion 420. As the cement displaces the brine, line 410 begins to level off. As time progresses, the cement cures at line portion 425 and the relative dielectric permittivity drops further to approximately 6. By determining the relative dielectric permittivity, a state of the fluid or cement can be determined.

FIG. 5A is an illustration of a diagram of an example swell packer monitoring 500 showing a cross section of a borehole. In some aspects, for example in horizontal boreholes, the mud (e.g., water, brine) cannot be fully swapped out by the incoming pumped cement. Therefore, it can be identified as an inconsecutive cement job. Sensors along the swell packer can be used to determine this situation. The swell packer can be used to fill up the cement job gap. The sensors can then be used to detect if there is any discontinuity in the cement job and to confirm if the swell packer has sufficiently deployed to close the gap due to the discontinuous cement job.

Swell packer monitoring 500 has a borehole through a subterranean formation 505. Inserted in the borehole is a pipe 507 surrounded by a swell packer 510. Around most of swell packer 510 is cement 515. Pooled underneath pipe 507 is borehole fluid 517, such as an oil-based mud, a water, or a brine. The data from the sensors indicated that there was a poor swap when the cement was pumped in and corrective action may need to be taken.

FIG. 5B is an illustration of a diagram of an example swell packer monitoring 530 after the swell packer has expanded. Building on FIG. 5A, swell packer monitoring 530 shows two sensors, sensor system 540 and sensor system 542. In some aspects, more or fewer sensor systems can be employed. Swell packer 510 is shown expanded and filling in the space that was filled with the borehole fluid in FIG. 5A. Sensor system 542, and sensor system 540 can be used to determine whether swell packer 510 has expanded sufficiently to form a seal against subterranean formation 505.

Figure 6:
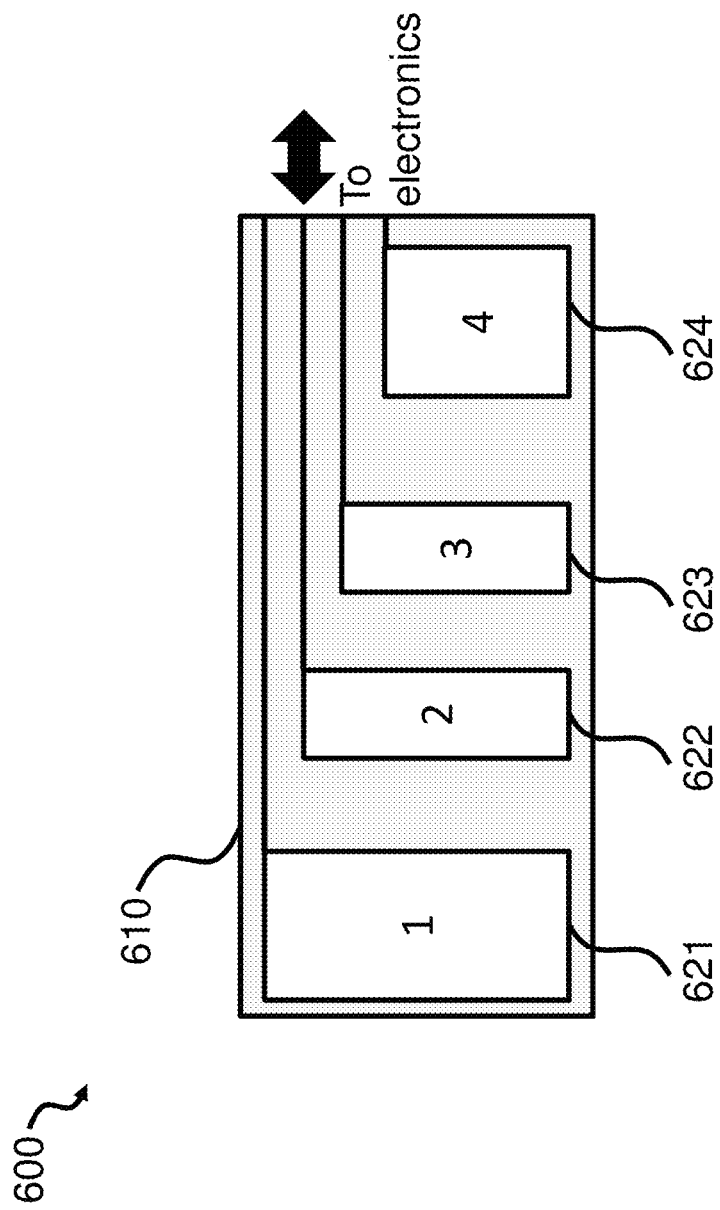
FIG. 6 is an illustration of a diagram of an example electrode layout that forms a sensor system used in this disclosure.

FIG. 6 is an illustration of a diagram of an example electrode layout 600 that forms a sensor system used in this disclosure. The sensor system can use multiple sensors for different depths of investigation. For example, there can be inner and outer electrodes. Electrode layout 600 has a sensor system 610 which contains four electrodes (e.g., a set of sensors). An electrode 621 is larger than the others. An electrode 622 and an electrode 623 are smaller electrodes than electrode 621 and are spaced proximate each other. An electrode 624 is of similar size to that of electrode 621 (the diagram shows it smaller to show the communication connectivity lines) and is spaced more distant from electrode 621 than the distance between electrode 622 and electrode 623. Sensor system 610 can receive power and communications from an electronics system, and can communicate collected data to the electronics system.

For example, there can be one or more sets of electrodes such as using electrode 621 and electrode 624 as one sensor, electrode 622 and electrode 623 as a second sensor, electrode 621 and electrode 622 as a third sensor, or electrode 623 and electrode 624 as a fourth sensor can provide different electrode spacing and different evaluation depths. In general, wider spaced electrodes evaluate deeper into the material. The electrodes are shown in a linear arrangement. In other aspects, the electrodes can be configured circumferentially, e.g., circular, rectangular, or in other orientations. In some aspects, the electrodes can be configured on the outer diameter of the pipe, forming a pattern similar to stripes on a candy cane.

In some aspects, the difference in the capacitance reading between different pairs of electrodes can be evaluated. In some aspects, the various sensor combinations can use various frequencies. In some aspects, the data can be collected over a time interval where the change in the data over time can be used in the analysis. In some aspects, data collected from different sensor systems located at different locations along the pipe (e.g., axially or circumferentially separation), can be compared and used in the analysis.

In some aspects, there can be guard rings around the capacitive sensor. Guard rings are an auxiliary electrode that surround either one of the electrodes or the entire capacitor in order to reduce edge effects. In some aspects, the guard rings can be connected to an electrical ground. In some aspects, the guard rings can be connected to an electrode or could be left floating (e.g., a floating guard ring). In some aspects, there can be a guard ring around each electrode and the guard rings can be electrically connected to each other. In some aspects, in a multi-layer capacitive sensor, the guard ring can be at a layer that is different from the electrode.

Figure 7:
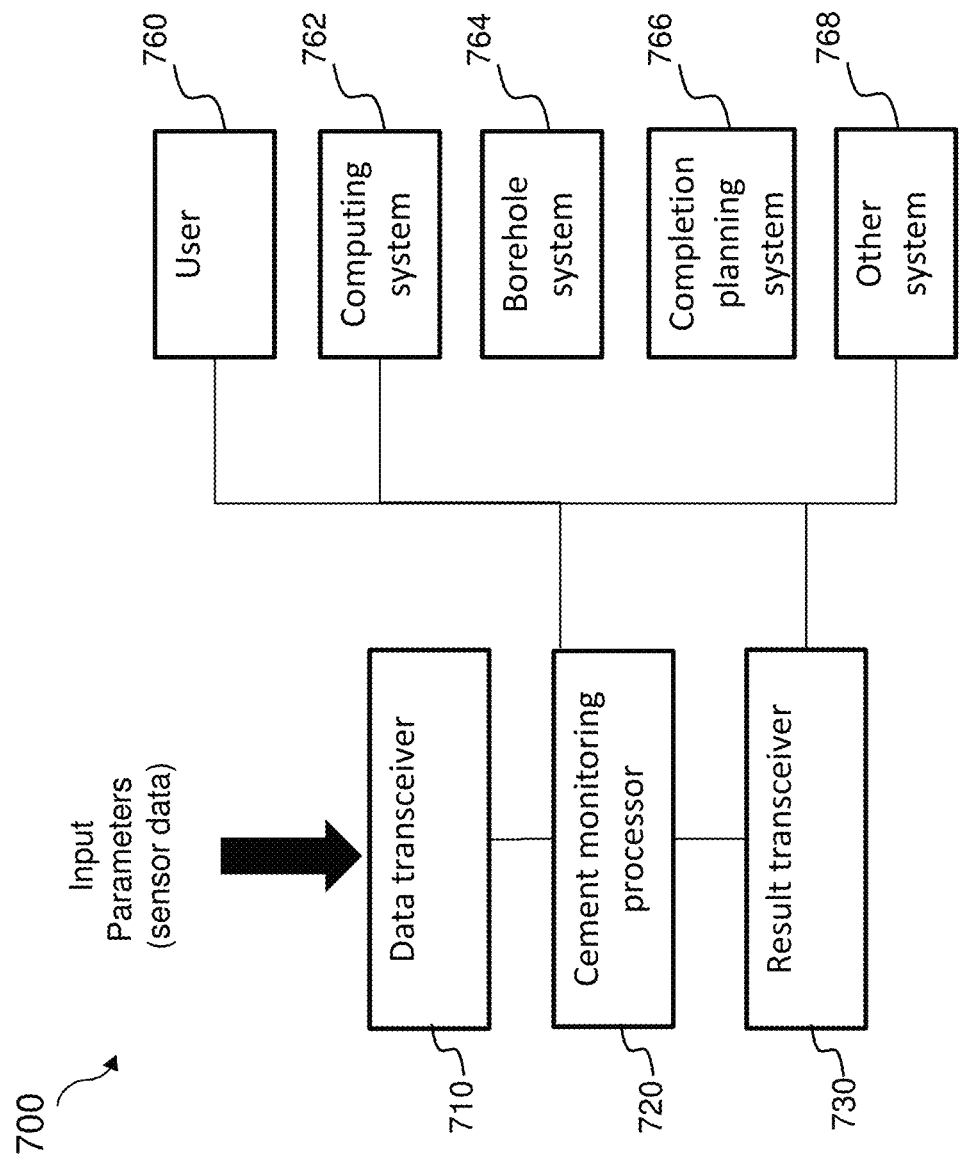
FIG. 7 is an illustration of a block diagram of an example cement monitoring system, which can be implemented in one or more computing systems.

FIG. 7 is an illustration of a block diagram of an example cement monitoring system 700, which can be implemented in one or more computing systems, for example, a data center, cloud environment, server, laptop, smartphone, tablet, and other computing systems. In some aspects, cement monitoring system 700 can be implemented using a cement monitoring controller such as cement monitoring controller 800 of FIG. 8. Cement monitoring system 700 can implement one or more systems of this disclosure, such as sensor system 610, or can implement one or more methods of this disclosure such as method 900 of FIG. 9.

Cement monitoring system 700, or a portion thereof, can be implemented as an application, a code library, a dynamic link library, a function, a module, other software implementation, or combinations thereof. In some aspects, cement monitoring system 700 can be implemented in hardware, such as a ROM, a graphics processing unit, or other hardware implementation. In some aspects, cement monitoring system 700 can be implemented partially as a software application and partially as a hardware implementation. Cement monitoring system 700 shows components that perform functions of the disclosed processes, and an implementation can combine or separate at least some of the described functions in one or more software or hardware systems.

Cement monitoring system 700 includes a data transceiver 710, a cement monitoring processor 720, and a result transceiver 730. Data transceiver 710, cement monitoring processor 720, and result transceiver 730 can be, or can include, conventional interfaces configured for transmitting and receiving data. Data transceiver 710 can receive input parameters, such as parameters to direct the operation of the analysis implemented by cement monitoring processor 720, and receiving the sensor data collected by one or more sensor systems. In some aspects, data transceiver 710 can be part of cement monitoring processor 720.

Cement monitoring processor 720 can be an cement monitoring analyzer and can implement the analysis as described herein utilizing the input parameters. For example, cement monitoring processor 720 can perform the analysis of the input parameters, compare data collected from different sensor systems or over a time interval, and generate analysis results indicating the change that can be used to determine the fluid composition, the cement state, or if the cement has a quality issue, and communicate the results to other systems, such as a well site controller, a completion planning system, or other well site systems. In some aspects, cement monitoring processor 720 can be a machine learning system, such as providing a process to analyze the collected input parameters from downhole sensors to provide a quality check on the data and to fill in potential gaps in the data.

A memory or data storage of cement monitoring processor 720 can be configured to store the processes for directing the operation of cement monitoring processor 720. Cement monitoring processor 720 can also include one or more processors that is configured to operate according to the analysis operations and algorithms disclosed herein, and an interface to communicate (transmit and receive) data.

Result transceiver 730 can communicate one or more results, analysis, or interim outputs, to one or more data receivers, such as a user or user system 760, a computing system 762, a borehole system 764, a completion planning system 766, or other systems 768 for processing or storing the analysis and potential quality issues, e.g., using a data store or database, whether located proximate result transceiver 730 or distant from result transceiver 730. The results, e.g., a determination of the fluid composition, cement state, cement quality, interim outputs from cement monitoring processor 720, and other outputs, can be communicated to one or more of the data receivers for processing or storing data.

Figure 8:
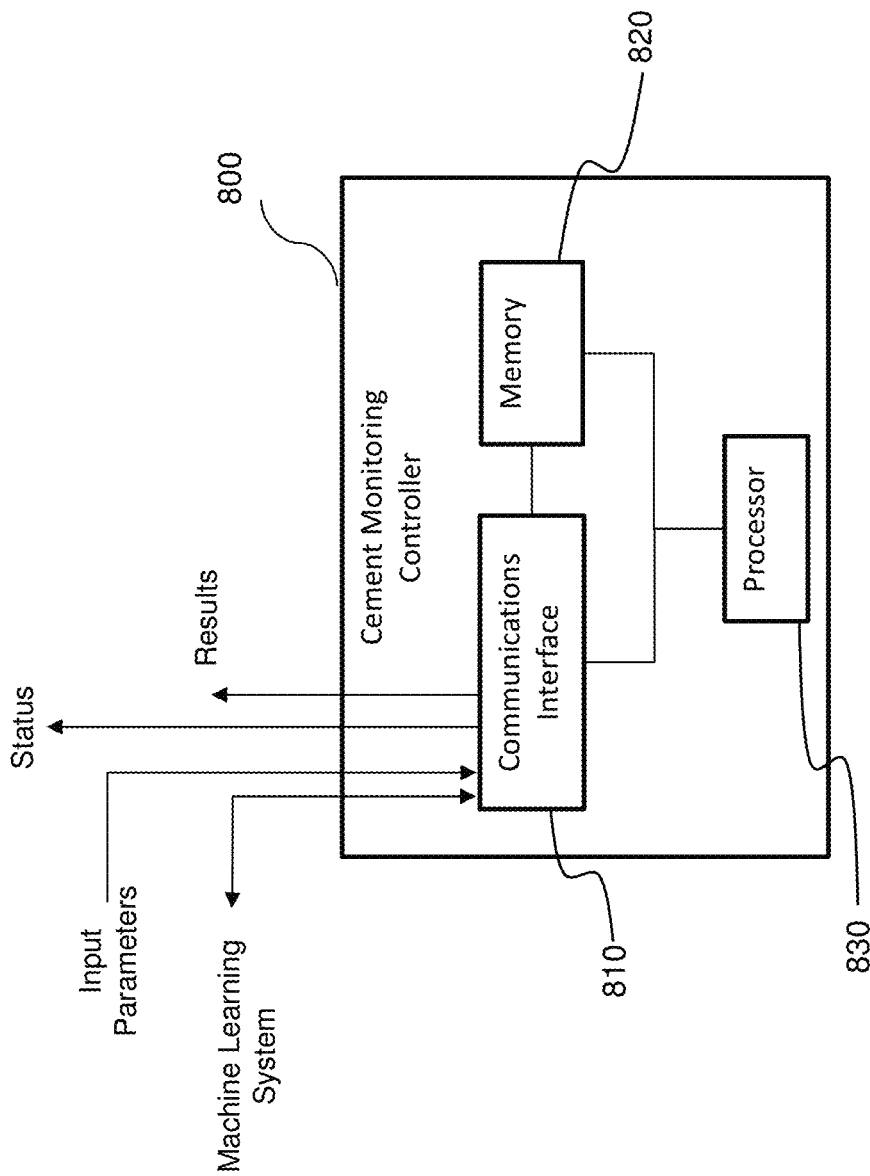
FIG. 8 is an illustration of a block diagram of an example of cement monitoring controller according to the principles of the disclosure.

FIG. 8 is an illustration of a block diagram of an example of cement monitoring controller 800 according to the principles of the disclosure. Cement monitoring controller 800 can be stored on a single computer or on multiple computers. The various components of cement monitoring controller 800 can communicate via wireless or wired conventional connections. A portion or a whole of cement monitoring controller 800 can be located at one or more locations, such as a data center, a reservoir controller, an edge computing system, a cloud environment, a server, a laptop, a smartphone, or other locations. In some aspects, cement monitoring controller 800 can be wholly located at a downhole, a surface, or distant location. In some aspects, cement monitoring controller 800 can be part of another system, and can be integrated in a single device, such as a part of a completion planning system, a well site controller, or other borehole system, for example a surface controller, a downhole controller, or a borehole controller. Cement monitoring controller 800 can implement one or more of the methods disclosed herein, such as method 900.

Cement monitoring controller 800 can be configured to perform the various processes disclosed herein including receiving input parameters, and generating results from an execution of the processes described herein. Cement monitoring controller 800 includes a communications interface 810, a memory 820, and one or more processors represented by processor 830.

Communications interface 810 is configured to transmit and receive data. For example, communications interface 810 can receive the input parameters, downhole sensor data, and other data. Communications interface 810 can transmit the analysis and determined fluid composition, cement state, cement quality, or interim outputs. In some aspects, communications interface 810 can transmit a status, such as a success or failure indicator of cement monitoring controller 800 regarding receiving the various inputs or transmitting the determined analysis.

In some aspects, communications interface 810 can receive input parameters from a machine learning system, for example, where the downhole sensor data is processed using one or more filters and algorithms prior to analyzing the relative changes in the data.

In some aspects, the machine learning system can be implemented by processor 830 and perform the operations as described by cement monitoring system 700. Communications interface 810 can communicate via communication systems used in the industry. For example, wireless or wired protocols can be used. Communication interface 810 is capable of performing the operations as described for data transceiver 710 and result transceiver 730 of FIG. 7.

Memory 820 can be configured to store a series of operating instructions that direct the operation of processor 830 when initiated, including the code representing the algorithms used for processing the collected data. Memory 820 is a non-transitory computer readable medium. Multiple types of memory can be used for data storage and memory 820 can be distributed.

Processor 830, e.g., a cement monitoring processor, can be configured to produce the generated results, e.g., the fluid composition, the cement state, the cement quality, one or more interim outputs, and statuses utilizing the received inputs. Processor 830 can be configured to direct the operation of cement monitoring controller 800. Processor 830 includes the logic to communicate with communications interface 810 and memory 820, and perform the functions described herein. Processor 830 can perform or direct the operations as described by cement monitoring processor 720 of FIG. 7 or method 900 of FIG. 9.

In some aspects, cement monitoring controller 800 can be part of borehole completion system 100, such as part of well site controller 107 or computing system 108. In some aspects, cement monitoring controller 800 can be part of swell packer 120 and swell packer 120 can further include a computer that is in communication (e.g., wired or wireless) with the at least one sensor. In some aspects, the cement monitoring system can be configured to determine the degree of expansion of the swell packer utilizing at least in part on the detected changes in the one or more electrical properties of the swell packer.

In some aspects, the cement monitoring system can include instrumentality or aggregate of instrumentalities operable to compute, estimate, classify, process, transmit, receive, retrieve, originate, switch, store, display, manifest, detect, record, reproduce, handle, or utilize forms of information, intelligence, or data for business, scientific, control, or other purposes. The cement monitoring system can be a processor-driven device, such as, but not limited to, a personal computer, laptop computer, smartphone, tablet, handheld computer, dedicated processing device, and/or an array of computing devices.

FIG. 9 is an illustration of a flow diagram of an example method 900 to monitor the quality of a cement job. Method 900 can be performed on a computing system, for example, cement monitoring system 700 or cement monitoring controller 800. The computing system can be a reservoir controller, a well site controller, a data center, a cloud environment, a server, a laptop, a mobile device, smartphone, PDA, or other computing system capable of receiving the input parameters, and capable of communicating with other computing systems. Method 900 represents an algorithm that can be encapsulated in software code or in hardware, for example, an application, code library, dynamic link library, module, function, RAM, ROM, and other software and hardware implementations. The software can be stored in a file, database, or other computing system storage mechanism, such as an edge computing system. Method 900 can be partially implemented in software and partially in hardware.

Method 900 starts at a step 905 and proceeds to a step 910. In step 910, one or more sensor systems can be located with a section of pipe, such as attached to a portion of the OD of the pipe, or located with a swell packer that is attached to the pipe. The sensors can be capacitive (e.g., capacitive sensor systems) or inductive (e.g., inductive sensor systems) types of sensors. The sensors can form one or more set of sensors. Each set of sensors can have two or more electrodes, e.g., sets of electrodes. The size and spacing of the electrodes within the set of electrodes can vary to provide a breadth, arc, and depth of area for analysis. The set of electrodes can measure one or more electromagnetic properties (e.g., electrical properties or magnetic properties), for example, electrical properties such as permittivity or resistivity, or magnetic properties such as permeability.

Along with the sensors, an electronics system can be located proximate the sensors to receive the sensor data and to direct operations of the sensors. For example, the electronics system can direct certain sets of electrodes to utilize one frequency and a different set of electrodes to utilize a second frequency, thereby improving the confidence level of the data collected, including improving the size and positioning of anomalies in the cement. The electronics system can communicate with a borehole system to receive instructions and to send the collected data or analysis. The pipe section can be inserted into a borehole and positioned downhole the borehole.

In a step 915, the electronics system can direct the configuration of the sets of sensors, such as a time interval to operate, a frequency to use, and other operational parameters. In a step 920, cement can be pumped into the location of the pipe.

While the cement is being pumped in, a step 925 can be performed to collect data from the sensor systems. The sensor systems can detect the change in dielectric permittivity (e.g., a relative dielectric permittivity difference) as the borehole fluid is displaced by the cement. This information can be used, for example, to stop pumping cement if it has reached a certain point or to continue pumping the cement until no more borehole fluid can be detected. Once the cement pumping has stopped in step 920, step 925 can continue to collect data from the sensors to monitor the state of the cement, such as monitoring the cure state of the cement. Once the cement has cured, step 925 can continue to collect data from the sensors to determine if defects have resulted from the curing of the cement, for example, micro annuluses or cracks (e.g., cement quality).

In a step 930, the data collected in step 925, in the various stages of step 925, can be used to analyze the fluid composition, cement state, or cement quality. The analysis can determine various results, such as poor swapping of borehole fluid for the cement, leaving pockets of borehole fluid, poor sealing of the cement with the pipe, swell packer, or subterranean formation (e.g., a micro annulus), cracks developing in the cement, or other types of results.

In a step 935, the data or results can be communicated to other borehole systems, such as a completion planning system where corrective actions can be determined and implemented (e.g., direct a corrective action). Method 900 ends at a step 995.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The present aspects are adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the disclosed aspects in the SUMMARY can have one or more of the following additional elements in combination. Element 1: wherein the material is a downhole fluid, a borehole fluid, a mud, a hydrocarbon, a water, or a brine. Element 2: wherein the data is used to determine a fluid composition. Element 3: wherein the material is a cement and the data is used to determine a cement state or a cement quality. Element 4: wherein the cement state is a cure state of cement and the cement quality is a parameter specifying an existence, a size, and a position of a micro annulus or a crack in the cement. Element 5: wherein the set of electrodes are located within the packer. Element 6: wherein the sensor system is one of a capacitive sensor system or an inductive sensor system. Element 7: wherein the set of electrodes is more than two electrodes and electrodes in the set of electrodes are of different sizes. Element 8: wherein the set of electrodes is more than two electrodes and the electrodes in the set of electrodes utilize uneven spacing from neighboring electrodes. Element 9: wherein the electronics system indicates to at least one electrode in the set of electrodes to utilize one or more frequencies. Element 10: wherein the set of electrodes is a first set of electrodes, and one or more additional sets of electrodes are part of the sensor system. Element 11: wherein the one or more additional sets of electrodes are located radially around the OD of the pipe. Element 12: wherein the one or more additional sets of electrodes are two, and the one or more additional sets of electrodes and the first set of electrodes are spaced approximately one hundred and twenty degrees apart. Element 13: wherein the one or more additional sets of electrodes are three, and the one or more additional sets of electrodes and the first set of electrodes are spaced approximately ninety degrees apart. Element 14: wherein the one or more borehole systems is a cement monitoring system, a well site controller, a surface controller, a downhole controller, a borehole controller, or a completion planning system. Element 15: wherein a guard ring is employed to surround the set of electrodes. Element 16: wherein the guard ring is located at a different layer than the set of electrodes when utilizing a multi-layer capacitive sensor. Element 17: wherein the guard ring is a floating guard ring or is electrically connected to an electrode in the set of electrodes. Element 18: wherein the guard ring is a first guard ring, and one or more additional guard rings are employed where there is one guard ring around each electrode in the set of electrodes, and the first guard ring and the one or more additional guard rings are electrically connected. Element 19: further including receiving the data from the sensor systems after the cement has cured. Element 20: further including analyzing the data to determine a cement quality, wherein the cement quality includes one or more of identifying a cement crack or a micro annulus. Element 21: wherein the analyzing further includes evaluating a difference in a capacitance between different pairs of electrodes in the one or more sensor systems. Element 22: wherein the analyzing further includes evaluating the data, wherein electrodes in the one or more sensor systems utilize at least two different frequencies. Element 23: wherein the analyzing further includes evaluating the data, wherein the data is collected from at least two different times within the time interval. Element 24: wherein the analyzing further includes evaluating the data, wherein the data is collected from at least two different sensor systems in the one or more sensor systems, and the at least two different sensor systems are located at different locations along the pipe, where the different locations are one of an axially or a circumferentially separation. Element 25: wherein the one or more of the fluid composition or the cement state is communicated to one or more borehole systems. Element 26: wherein the collecting further includes filtering noise from the data by changing an internal pressure of the pipe while the sensor systems are collecting the data. Element 27: further including communicating the results to a borehole system, and utilizing the results to direct corrective action and update a completion planning system.

What is claimed is:

1. A sensor system, comprising:
   a set of electrodes located external of a pipe and proximate a packer, wherein the packer is operational to expand to seal against a subterranean formation around a borehole, where the packer is attached to an outer diameter (OD) of the pipe and is inserted in the borehole, and wherein the set of electrodes measure one or more electromagnetic properties of a material between the packer and the subterranean formation; and
   an electronics system, which at a time when the cement is curing, receives data from the set of electrodes, communicates with one or more borehole systems, directs at least one electrode in the set of electrodes to utilize two or more frequencies over a first time interval, and compares a relative amplitude of the dielectric measurement of the two or more frequencies and the data is used to determine a cement state or a cement quality.

2. The sensor system as recited in claim 1, wherein the material is a downhole fluid, a borehole fluid, a mud, a hydrocarbon, a water, or a brine, and the data is used to determine a fluid composition, or the material is the cement and the data is used to determine a cement state or a cement quality.

3. The sensor system as recited in claim 2, wherein the cement state is a cure state of cement and the cement quality is a parameter specifying an existence, a size, and a position of a micro annulus or a crack in the cement.

4. The sensor system as recited in claim 1, wherein the set of electrodes are located within the packer.

5. The sensor system as recited in claim 1, wherein the set of electrodes is one of capacitive sensors or inductive sensors.

6. The sensor system as recited in claim 1, wherein the set of electrodes is more than two electrodes and electrodes in the set of electrodes are of different sizes.

7. The sensor system as recited in claim 1, wherein the set of electrodes is more than two electrodes and the electrodes in the set of electrodes utilize uneven spacing from neighboring electrodes.

8. The sensor system as recited in claim 1, wherein the electronics system compares a relative amplitude of the dielectric measurement at one frequency of the two or more frequencies against an average relative amplitude across a range of frequencies.

9. The sensor system as recited in claim 1, wherein the set of electrodes is a first set of electrodes, and one or more additional sets of electrodes are present, wherein the one or more additional sets of electrodes are located radially around the OD of the pipe.

10. The sensor system as recited in claim 9, wherein the one or more additional sets of electrodes are two, and the one or more additional sets of electrodes and the first set of electrodes are spaced approximately one hundred and twenty degrees apart.

11. The sensor system as recited in claim 9, wherein the one or more additional sets of electrodes are three, and the one or more additional sets of electrodes and the first set of electrodes are spaced approximately ninety degrees apart.

12. The sensor system as recited in claim 1, wherein the one or more borehole systems is a cement monitoring system, a well site controller, a surface controller, a downhole controller, a borehole controller, or a completion planning system.

13. The sensor system as recited in claim 1, wherein a guard ring is employed to surround the set of electrodes.

14. The sensor system as recited in claim 13, wherein the guard ring is located at a different layer than the set of electrodes when utilizing a multi-layer capacitive sensor.

15. The sensor system as recited in claim 13, wherein the guard ring is a floating guard ring or is electrically connected to an electrode in the set of electrodes.

16. The sensor system as recited in claim 13, wherein the guard ring is a first guard ring, and one or more additional guard rings are employed where there is one guard ring around each electrode in the set of electrodes, and the first guard ring and the one or more additional guard rings are electrically connected.

17. A sensor system, comprising:
a set of electrodes located external of a pipe and proximate a packer, wherein the packer is operational to expand to seal against a subterranean formation around a borehole, where the packer is attached to an outer diameter (OD) of the pipe and is inserted in the borehole, and wherein the set of electrodes to measure one or more electromagnetic properties of a material between the packer and the subterranean formation; and
an electronics system which receives data from the set of electrodes, communicates with one or more borehole systems, directs at least one electrode in the set of electrodes to utilize two or more frequencies over a first time interval, and compares a relative amplitude of the dielectric measurement of the two or more frequencies, at a time when a cement is pumped downhole the borehole to the location of the set of electrodes and the data is used to determine a cement state or a cement quality.

18. The sensor system as recited in claim 17, wherein the material is a downhole fluid, a borehole fluid, a mud, a hydrocarbon, a water, or a brine, and the data is used to determine a fluid composition.

19. A method, comprising:
locating one or more sensor systems external and proximate a pipe positioned downhole a borehole, wherein the one or more sensor systems are located at an outer diameter of the pipe and the borehole is not cased;
locating a packer proximate the one or more sensor systems, wherein the packer is operational to expand to seal against a subterranean formation around the borehole, where the packer is attached to the outer diameter of the pipe and is inserted in the borehole, and wherein the one or more sensor systems measure one or more electromagnetic properties of a material between the packer and the subterranean formation;
configuring the one or more sensor systems, wherein the configuring includes operating in at least one time interval and applying two or more frequencies to an electrode of a sensor of the one or more sensor systems over the at least one time interval, and where the one or more sensor systems use one or more of a capacitive sensor or an inductive sensor; pumping cement to the location of the sensor systems;
collecting data with an electronics system from the sensor systems during the at least one time interval; and
analyzing the data to generate results, wherein the analyzing utilizes a relative dielectric permittivity difference of one or more of the fluid composition, an uncured cement, or a cured cement, and wherein the analyzing compares a relative amplitude of the dielectric measurement of the two or more frequencies and the data is used to determine one or more of a fluid composition, a cement state or a cement quality.

20. The method as recited in claim 19, further comprising:
receiving the data from the sensor systems after the cement has cured; and
analyzing the data to determine a cement quality, wherein the cement quality includes one or more of identifying a cement crack or a micro annulus.

21. The method as recited in claim 19, wherein the analyzing further comprises:
evaluating a difference in a capacitance between different pairs of electrodes in the one or more sensor systems.

22. The method as recited in claim 19, wherein the analyzing further comprises:
evaluating the data, wherein electrodes in the one or more sensor systems utilize at least two different frequencies.

23. The method as recited in claim 19, wherein the analyzing further comprises:
evaluating the data, wherein the data is collected from at least two different times within the time interval.

24. The method as recited in claim 19, wherein the analyzing further comprises:
evaluating the data, wherein the data is collected from at least two different sensor systems in the one or more sensor systems, and the at least two different sensor systems are located at different locations along the pipe, where the different locations are one of an axially or a circumferentially separation.

25. The method as recited in claim 19, wherein the one or more of the fluid composition or the cement state is communicated to one or more borehole systems.

26. The method as recited in claim 19, wherein the collecting further comprises:
   filtering noise from the data by changing an internal pressure of the pipe while the sensor systems are collecting the data.

\* \* \* \* \*